US005963983A

United States Patent [19]

Sakakura et al.

[11] Patent Number: 5,963,983

[45] Date of Patent: Oct. 5, 1999

[54] METHOD AND APPARATUS FOR DYNAMICALLY CREATING CONVERSION TABLES TO ACCESS A SEMICONDUCTOR MEMORY DEVICE

[75] Inventors: Tohru Sakakura, Yamato; Yoshinori Sakaue, Sagamihara, both of Japan

[73] Assignee: International Business Machines Corporation, Armonk, N.Y.

[21] Appl. No.: 08/842,554

[22] Filed: Apr. 15, 1997

[30] Foreign Application Priority Data

Apr. 15, 1996 [JP] Japan .................................... 8-092313

[51] Int. Cl.[6] ...................................................... G06F 12/00

[52] U.S. Cl. .......................... 711/202; 711/103; 711/206; 711/209

[58] Field of Search .................................... 711/202, 205, 711/206, 209, 203, 204, 103, 115, 207, 221

[56] References Cited

U.S. PATENT DOCUMENTS

| | | | |
|---|---|---|---|
| 5,113,512 | 5/1992 | Miki et al. | 395/425 |
| 5,524,230 | 6/1996 | Sakaue et al. | 395/430 |
| 5,530,828 | 6/1996 | Kaki et al. | 395/430 |
| 5,666,560 | 9/1997 | Moertl et al. | 395/888 |
| 5,740,396 | 4/1998 | Mason | 395/430 |
| 5,742,934 | 4/1998 | Shinohara | 711/103 |
| 5,809,515 | 6/1996 | Kaki et al. | 711/103 |
| 5,809,516 | 12/1995 | Ukai et al. | 711/114 |
| 5,822,784 | 6/1996 | Garney | 711/208 |

OTHER PUBLICATIONS

"Advanced Microprocessors", 2nd Edition, pp. 57–65; Daniel Tabak, Dec. 1995.

*Primary Examiner*—Eddie P. Chan
*Assistant Examiner*—Kimberly Nicole McLean
*Attorney, Agent, or Firm*—Monica D. Lee

[57] ABSTRACT

An improved external semiconductor memory device having a work memory for storing logical address-physical address conversion information. According to one embodiment of the present invention, a semiconductor memory device, which is connected to a host computer system and can be addressed as predetermined sector units, comprises: (a) a data storage having a nonvolatile memory that can be electrically rewritten; (b) an interface connected to the host computer system for receiving an access request; (c) volatile work memory; (d) first table preparating means for preparing a first table in the volatile work memory, by the page which consists of a plurality of sectors, for converting the requested logical sector address into a physical sector address among a physical memory space of the data storage; (e) second table preparation means for preparing a second table in the volatile work memory, by the unit which consists of a plurality of pages, for converting a logical page numbers addressed by the access request into a physical page numbers among a physical memory space of the data storage; (f) second access control means for, in response to an access request from the host computer system, referring to the second table for a unit to which the designated logical sector address belongs in order to acquire a corresponding physical page number; (g) first access control means for, in response to an access request from the host computer system, referring to the first table for a physical page to which the designated logical sector address belongs in order to acquire a corresponding physical sector address; and (h) data access means for accessing the data storage in accordance with the acquired physical sector address.

12 Claims, 10 Drawing Sheets

* Numbers in parentheses indicate absolute logical page numbers of assigned logical pages.

SLT Preparation Routine

SLT Preparation Routine for Physical Page

METHOD AND APPARATUS FOR DYNAMICALLY CREATING CONVERSION TABLES TO ACCESS A SEMICONDUCTOR MEMORY DEVICE

BACKGROUND OF THE INVENTION

1. Field of the Invention

The present invention relates to a semiconductor memory device, and more specifically to a semiconductor memory device that includes, non-volatile erasable semiconductor memory, such as flash memory that can be addressed by memory sectors.

2. Description of the Background

External storage device:

In accordance with recent developments in technologies, various types of personal computers, such as desktop computers for use in offices and notebook computers for use in mobile environments, have been developed and marketed. Generally, these computer systems include main memory and an external storage device. It is preferable that the external storage device has a large memory capacity with a low storage capacity unit cost.

The external storage devices may be conventional hard disk drives (HDD) or floppy disk drives (FDD) that employ disk storage media. These disk storage devices typically provide large memory capacity at relatively low prices and operating costs; but, require highly delicate mechanical technology to perform various operations with a magnetic head, such as a disk seek operation. Accordingly, the disk storage devices may be easily damaged by physical impact and therefore considered less reliable than other types of memory devices.

In the past, external memory devices of the type that use semiconductor memory as a storage medium, such as SRAM (static random access memory) or DRAM (dynamic random access memory) have not provided a viable alternative to disk storage devices. Although semiconductor type external memory devices have faster processing speeds than disk access times and are less likely to be damaged upon physical impact, inherent drawbacks associated with SRAM and DRAM technology have prevented the use of SRAM and DRAM technology for mass storage.

In general, the price per memory capacity of SRAM is too high to make SRAM cost-effective for mass storage. Furthermore, the additional power required to save data held in DRAM typically increases the operating costs of the external storage device, and the power consumption associated with a DRAM refresh operation makes it difficult to implement DRAM in mobile environments where reduced power consumption is typically desirable.

On the other hand, external semiconductor memory devices that are implemented with flash memory, such as flash EEPROM (electrically erasable read-only-memory) provides a viable alternative to disk storage devices in certain applications. Flash memory devices are non-volitile memory devices that may be programmed more than once. Furthermore, flash memory devices have a simple structure that may be easily implemented. Because flash memory devices typically have low power consumption, are compact and light, and are less likely to be damaged from physical impact, they are often well suited for mobile environments, despite the trade-offs associated with flash memory devices. These trade-offs may include the requirement that an erase operation is performed prior to a programming (or re-write) operation, the requirement for a high voltage (e.g., 12 v or 20v) to perform erase operation, and the requirement that a relative large memory unit that may include several KB to several hundreds of KB must be erased simultaneously.

Accessing an external storage device:

A computer system (hereinafter also referred to as a "host") accesses an external storage device, such as an HDD, by designating a logical address. The logical address refers to a position among a logical memory space which host software (i.e., an operating system or an application) recognizes, as compared to a physical storage location. Thus, a logical address is converted into a physical address corresponding to a physical memory space in the external storage device in order to access the addressed physical memory space.

Typically, an external storage device that uses flash memory requires additional software, referred to as disk emulation software, to ensure compatibility with the host during an access operation. Compatibility between the host and the external flash storage device during an access operation may be acheived by running a file system such as MS-FFS (flash file system) or FTL (flash translation layer) on the host. Alternatively, compatibility between the host and the external flash storage device during an access in operating may be achieved by running a conventional file system such as PCMCIA ATA (at attachment) to emulate a HDD inside the external flash memory device. In other words, the host recognizes the external flash memory device as a HDD and accesses the external flash memory device in the same manner as a HDD.

When the host runs the FFS or FTL file system, the structure of the external semiconductor memory device may be simplified, and its price satisfactorily low. However, the overhead relative to the host may be increased, and problems may arise concerning compatibility between conventional programs and device drivers, and compatibility between different device drivers. On the other hand, when a conventional file system such as PCMCIA ATA is used to emulate the HDD, although the structure of an external semiconductor memory device is complicated, the host can handle the semiconductor memory device in the same manner as it does a conventional HDD, and no compatibility problems typically occur. As the memory capacity is increased, the price difference between the two systems is reduced, and the second system is therefore used in many cases.

When a conventional file system is used to emulate a HDD, two types of systems may be used. A first type includes a system for fixing a correspondence between a physical address and a logical address. A second type includes a system for varying a correspondence between a physical address and a logical address.

In the first type of system, when a write request is for fewer sectors than there are in a unit to be erased, the data in the unit to be erased must be temporarily read and saved in a transfer buffer, and then subsequently written back after the erasing has been performed. In the second type of system, information describing the correspondence between a logical address and a physical address must be stored and updated in an area other than the flash memory.

A conventional HDD file system divides a file into a data portion and a file management data portion (e.g., a FAT (File Allocation Table) or a directory), and stores them on a disk. When accessing the data portion, many sectors are accessed a few times. But when accessing the file management data portion, a few sectors are accessed many times. Because management information related to stored files is collectively placed in the file management data portion, access to the file management data portion is generally centralized.

Under the control of a conventional file system, the first type of system performs an erase operation each time an access is made. Thus, the efficiency of the system may be reduced, especially when a write operation is performed for a small number of sectors. Even when the first type of system performs the write operation for many sectors, efficiency is typically reduced unless the size of the data to be written matches the size of the erased unit. In the event that the power supply is suddenly cut off during an erase operation, all data in the transfer buffer, including data that is not to be written, is typically lost. On the other hand, the second type of system performs a write operation without conducting an erase operation as long as there is an empty sector. The second type of system is considered to be very efficient relative to the first type of system.

Flash memory devices are typically limited to the number of times each flash memory cell may be erased. Accordingly, the life of the flash memory device may be extended by uniform use of the entire flash memory device. The first type of system typically increases the frequency at which a file management data portion is written, and may be increased to such an extreme degree that the entire flash memory device can no longer provide reliable data. On the other hand, with the second type of system, even when data is written to the same logical address, the entire flash memory can be uniformly used by assigning different physical addresses. Because data is not erased for every write operation, the frequency at which the flash memory is erased is fewer than those of the first type of system. Generally, the second type of system is regarded as superior to the first type of system.

One embodiment of an external semiconductor memory device employing the second type of system is described below. FIG. 11 illustrates the structure of a physical memory space in an external flash memory device of the second type of system. The flash memory device includes a plurality of physical sectors. A physical sector address is sequentially allocated for each physical sector, beginning at the head sector in the physical memory space. One physical sector has a length of 528 bytes, and consists of three fields: a 6-byte header portion, a 512-byte data portion, and a 10-byte ECC portion. The header portion is used to store a logical sector address of the physical sector currently being allocated and a CRC (Cyclic Redundancy Check) code. The data portion stores the data body to be accessed. The ECC portion stores an error correction code. By including the CRC in the header portion, detection of errors can be performed after the head portion has been read. Correction of errors can be performed by using the ECC after all the sectors have been read.

According to FIG. 11, a logical sector address is provided for each physical sector that represents a minimum addressable unit. A memory device also referred to as a work memory stores a sector Location Table (SLT) that contains information for converting a logical sector address into a physical sector address. FIG. 12 illustrates the structure of the SLT. Each entry in the SLT corresponds to a logical sector entered in address order beginning at the head, and includes a field for storing the address of the physical sector that is currently being allocated for a corresponding logical sector. When access to the logical address #n is requested, the n-th entry from the beginning of the SLT is referenced to obtain a corresponding physical sector address.

A semiconductor memory, such as a DRAM, may be used as a work memory for storing the SLT. During a power-on operation or a reset operation, the header portions of all the physical sectors in the flash memory are scanned and logical address-physical address conversion information (SLT) is prepared in the work memory. During an access operation, the work memory is referenced to quickly acquire a physical address. The SLT, may be updated easily and rapidly.

By incorporating flash memory for storing data and files and a work memory for managing position information into an external semiconductor device, address information may be acquired immediately, and the flash memory may be accessed more efficiently.

Size of work memory;

The size of the SLT, is proportional to the number of sectors included in the memory space. As the memory capacity of the flash memory is increased and the size of the SLT is also increased, the capacity of the work memory area for storing the SLT is increased.

A flash memory having 64 MB, may include 120 K or more physical sectors, each of which consists of approximately 500 bytes. A minimum of 17-bits is required for the sector address of 120 K physical sector . Because a computer typically operates in byte units, a minimum of three bytes (=24-bit>17-bit) may be required for each entry in the sector location table (SLT) in order to store the physical sector addresses. The number of entries required to be stored in the SLT is equivalent to the number of sectors in the memory space. For example, the size required for the SLT may be approximately 360 K bytes for 120 K entries. As the capacity of the flash memory as a storage medium is increased, the capacity of the work memory must also be increased. A large work memory typically affects the price of the external semiconductor memory device.

The work memory is a volatile memory device that is used to temporarily stores data. When the memory device is powered on or when a reset has occurred, no address conversion information, such as the SLT, is stored in the work memory. Generally, the preparation of the SLT is part of the power on operation of the external semiconductor memory device. To prepare the SLT, the header portions of all the physical sectors are searched. When the capacity of flash memory used as a storage medium increases and the number of sectors is increased proportionally, the time for the preparation of the SLT is accordingly extended, and the period needed for the power on process is lengthened.

Thus, when the work memory becomes larger, an additional saving operation is required, which results in the increased power consumption.

SUMMARY OF THE PRESENT INVENTION

An object of the present invention to provide an improved external semiconductor memory device that employs nonvolatile and erasable semiconductor memory, such as flash memory as a storage medium.

Another object of the present invention to provide an improved external semiconductor memory device that addresses a storage location having a predetermined size, such as a sector, and that includes volatile work memory, for storing logical address-physical address conversion information.

An additional object of the present invention to provide an improved external semiconductor memory device that can adequately manage logical-physical address conversion information with a work memory having a relatively small capacity.

One embodiment of the present invention describes, a semiconductor memory device, which is connected to a host computer system and can be addressed by the predetermined sector. The semiconductor memory device includes: (a) a data storage having a nonvolatile memory that can be electrically rewritten; (b) an interface connected to the host computer system for receiving an access request; (c) volatile work memory; (d) table preparing means for preparing, in response to the access request from the host computer system, a table, relative to only part of one area of the physical memory space in which the requested logical sector is located, for converting a logical sector address into a physical sector address among a physical memory space in the data storage; (e) access control means for referring to the table to acquire the physical sector address corresponding to the requested logical sector address; and (f) data access means for accessing the data storage in accordance with the acquired physical sector address.

A second embodiment of the present invention describes a semiconductor memory device, which is connected to a host computer system and can be addressed as predetermined sector units. The semiconductor memory device includes: (a) a data storage having a nonvolatile memory that can be electrically rewritten; (b) an interface connected to the host computer system for receiving an access request; (c) volatile work memory; (d) first table preparing means for preparing a first table in the volatile work memory, by the page which consists of a plurality of sectors, for converting a logical sector address addressed by the access request into physical sector addresses among a physical memory space of the data storage; (e) second table preparing means for preparing a second table in the volatile work memory, by the unit which consists of a plurality of pages, for converting a logical page number addressed by the access request system into a physical page number among a physical memory space of the data storage; (f) second access control means for, in response to an access request from the host computer system, referring to the second table for a unit to which the requested logical sector address belongs in order to acquire the physical page numbercorresponding to the requested logical sector address; (g) first access control means for, in response to an access request from the host computer system, referring to the first table for a physical page to which the requested logical sector address belongs in order to acquire the physical sector address corresponding to the requested logical sector address; and (h) data access means for accessing the data storage in accordance with the acquired physical sector address.

For the second embodiment, the first table preparing means may include means for preparing a first table storage area for each offset for the same page in each unit, so that the same table storage area can be used in common by the same offset pages in each unit. As a result, the memory capacity required for the work memory for the first table is almost the equivalent of the number of page offsets in the unit. Therefore, compared with the case where the whole logical sector address-physical sector address conversion table is prepared in the memory space, the size of the work memory can be considerably reduced.

Furthermore, for the second embodiment, the first access control means may include means for determining whether or not, in the work memory, there exists the first table for a page to which the requested logical sector address belongs, and means for, when a negative result for a determination is obtained, requesting the first table preparing means to prepare the first table for the page.

Since the work memory is volatile, the first table is not yet prepared when the semiconductor memory device is powered on. The same area for a first table storage area is used in common by those pages of the several units that have the same page offset. Therefore, a desired first table sometimes has not yet been prepared in a corresponding first table storage area in the work memory. In such a case, the first access control means calls the first table preparing means to prepare the corresponding first table.

Since the first table is prepared in a predetermined area that is used in common with another page, i.e., since the first table is overwritten when a table for another page is prepared, an additional storage area is not required for calling the first table preparing means. The first table is not prepared in the power on operation, but in response to an access request issued by the host computer system. As a result, only a short period is required for the power on process.

In addition, according to the second embodiment, the second table preparing means may include means for preparing one second table storage area for each unit. The second access control means may include means for calculating the number of a unit to which the requested logical sector address belongs, and for calculating a logical page offset in the unit. The second access control means may also include means for determining whether or not, in the work memory, there exists the second table for a unit to which the requested logical sector address belongs, and means for, when a negative result for a determination is obtained, requesting the second table preparing means to prepare the second table for the unit.

Since the work memory is volatile, the second table is not yet prepared when the semiconductor memory device is powered on. If a corresponding second table is not yet prepared when the semiconductor memory device is accessed by the host computer system, the second table preparing means is called to prepare the corresponding second table. A second table is prepared for each unit, and a single table storage area is not shared with the other units. The prepared second table is resident in the work memory, and is also employed for the next access.

The present invention describes a first control method, for a semiconductor memory device that can be addressed by the predetermined sector and that comprises a data storage having a nonvolatile memory which can be electrically rewritten, an interface connected to the host computer system to receive an access request, and a volatile work memory. The first method includes the steps of (a) preparing a table preparing step of, in response to an access request from the host computer system, relative to only one part of the memory space to which the requested logical sector address belongs, for converting a logical sector address into a physical sector address among a physical memory space of the data storage; (b) referring to the table to acquire the physical sector address corresponding to the requested logical sector address; and (c) accessing the data storage in accordance with the acquired physical sector address.

The present invention describeds a second control method, for a semiconductor memory device that can be addressed by the predetermined sector and that comprises a data storage having a nonvolatile memory which can be electrically rewritten, an interface connected to the host computer system to receive an access request, and a volatile work memory. The second method includes the steps of: (a) preparing, in response to an access request from the host computer system, a first table in the volatile work memory for converting, by the page which consists of a plurality of sectors, a logical sector address addressed by the access request into a physical sector addresses among a physical memory space of the data storage; (b) preparing, in response to an access request from the host computer system, a second table in the volatile work memory, by the unit which consists of a plurality of pages, for converting a logical page number addressed by the access request into a physical page number among a physical memory of the data storage; (c) referring, in response to the access request from the host computer system, to the second table for a unit to which the requested logical sector address belongs in order to acquire the physical page number corresponding to the requested logical sector address; (e) referring, in response to the access request from the host computer system, to the first table for a physical page to which the requested logical sector address belongs in order to acquire the physical sector address corresponding logical address; and (f) accessing the data storage in accordance with the acquired physical sector address.

According to step (a) of the second method, a first table storage area may be prepared for each offset for the same page in each unit, so that the same table storage area can be used in common by the same offset pages in each unit. As a result, the memory capacity required for the work memory for the first table is almost the equivalent of the number of page offsets in the unit. Therefore, with the case where the whole logical sector address-physical sector address conversion table is prepared in the memory space, the size of the work memory can be considerably reduced.

Furthermore, according to the second method step (d) may include a step of determining whether or not, in the work memory, there exists the first table for a page to which the requested logical sector address belongs, and a step of, when a negative result for a determination is obtained, jumping to the step (a) whereat the first table is prepared for the page.

Since the work memory is volatile, the first table is not yet prepared when the semiconductor memory device is powered on. The same memory area for a first table storage area is used in common by those pages of the several units that have the same page offset. Therefore, a desired first table sometimes has riot yet been prepared in a corresponding first table storage area in the work memory. In such a case, the first step (a) is called to prepare the corresponding first table.

Since the first table is prepared in a predetermined area that is used in common with another page, i.e., since the first table is overwritten when the table for another page is prepared, an additional storage area is not required for calling the first step (a).

The first table is not yet prepared in the power on operation, but in response to an access request issued by the host computer system. As a result, only a short period is required for the power on process.

According to the second method, at the step (b), one second table storage area may be prepared for each unit.

According to the second method, the second access control means may include a step of calculating the number of a unit to which the requested logical sector address belongs, and for calculating a logical page offset in the unit.

According to the second method, the step (c) may include a step of determining whether or not, in the work memory, there exists the second table for a unit to which the requested logical sector address belongs, and a step of, when a negative result for a determination is obtained, jumping to the step (b) to prepare the second table for the unit.

Since the work memory is volatile, the second table is not yet prepared when the semiconductor memory device is powered on. If a corresponding second table is not yet present when the semiconductor memory device is accessed by the host computer system, the second table preparing means is called to prepare the corresponding second table. A second table is prepared for each unit, and a single table storage area is not shared with the other units. The prepared second table is resident in the work memory, and is also employed for the next access.

According the semiconductor memory device of the present invention and the control method therefor, it is not necessary to prepare a logical-physical address convertion table that may occupy the entire memory space. The logical address-physical address conversion table is prepared by the page, which is a set of a plurality of sectors, and a storage area for the table is shared by a plurality of pages. In other words, a conversion table relative to a page currently being accessed is used by overwriting the storage area for an unnecessary conversion table. Therefore, the memory capacity required for the preparation of the conversion table can be substantially reduced, and the work memory can accordingly be smaller.

More specifically, the logical address-physical address conversion table consists of a first table, which is prepared for each page that is a set composed of a plurality of sectors, in order to acquire a sector address; and a second table, which is prepared for each unit that is a set composed of a plurality of pages, in order to acquire a page offset in a unit. All the first and the second tables are not yet prepared when the semiconductor memory device is powered on. Instead, only the tables for a corresponding range are prepared, as needed, in response to an access request from the host computer system. The period required for the power on process of the semiconductor memory device of the present invention is much shorter than that required for a conventional device, which prepares a conversion table that may occupy the entire memory space.

Since the size of the volatile work memory can be smaller, the power required for performing a data saving operation can be reduced.

The other objects, features, and advantages of the present invention will become apparent in due course during the detailed description of the embodiment of the present invention, which will be given while referring to the accompanying drawings.

BRIEF DESCRIPTION OF THE DRAWINGS

The present invention is illustrated by way of example and not limitation in the figures of the accompanying drawings, in which like references indicate similar elements, and in which.

DESCRIPTION OF THE PREFERRED EMBODIMENT

A. Hardware Arrangement of Semiconductor Memory Device

Figure 1:
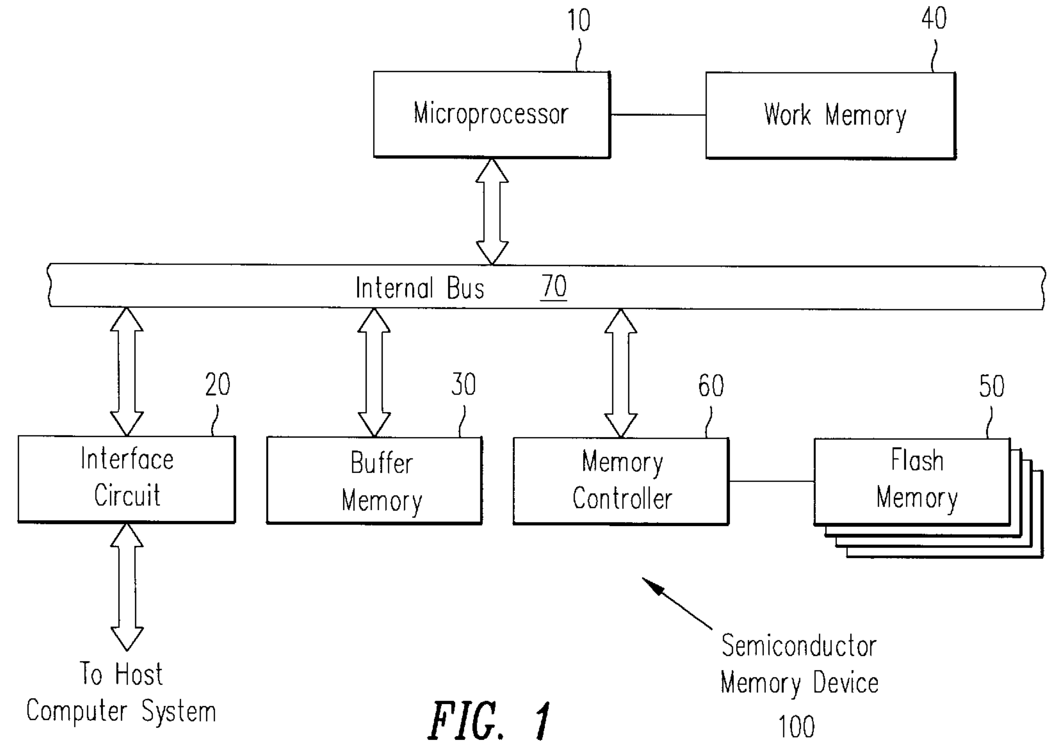
FIG. 1 is a schematic diagram illustrating the hardware arrangement of a semiconductor memory device 100 according to one embodiment of the present invention.

FIG. 1 is a schematic diagram illustrating the hardware arrangement of a semiconductor memory device 100 for one embodiment of the present invention. The semiconductor memory device 100 may be defined as one of the external storage devices connected to a host computer system (not shown). As is shown in FIG. 1, the semiconductor memory device 100 includes a microprocessor 10, an interface circuit 20, a buffer memory 30, a work memory 40, a flash memory 50, a memory controller 60, and an internal bus 70.

The internal bus 70 provides a common signal transfer path for coupling the various sections within the memory device 100, and includes an address bus, a data bus and a control bus.

The interface circuit 20 implements the interface protocols with the host computer system, and includes various registers (not shown) such as a command register for designating a process to be executed, (e.g., write access or read access); an address register for setting a logical address (i.e., logical sector address) for data accessing; a data register for storing writing/reading data; and a status register for notifying the host computer system of the result of the execution of the process by the memory device 100. The interface circuit 20 typically conforms to the IDE (Integrated Drive Electronics) or the PCMCIA ATA standard, and may also be coupled to a bus (such as an ISA bus as a system bus, or a PCMCIA bus/CardBus, none of them shown) that is mounted on the host computer system. The host computer system can access the respective registers in the interface circuit 20.

The microprocessor 10 is a central controller for controlling the entire operation (including the writing/reading operation relative to the flash memory 50) of the memory device 100. The operation of the microprocessor 10 is controlled by program code stored in a ROM (not shown) or in a dedicated area in the flash memory 50. For example, when the host computer system issues an access request to the semiconductor device 100, the microprocessor 10 reads data from the registers in the interface circuit 20 and acquires the contents of a command and a logical address for an access destination under the control of the program code. The interface circuit 20 acquires a physical address in accordance with the logical address-physical address conversion information in the work memory 40, and physically accesses the flash memory 50.

The work memory 40 is a volatile memory, such as DRAM, and is mainly used as work area for the microprocessor 10. The work memory 40 stores logical address-physical address conversion information used for converting a logical address, which is designated by the access request, into a physical address, which is a real address in the physical memory space of the flash memory 50. For this embodiment, the logical address-physical address conversion information is managed by using two types of tables: a unit information table (UIT) and a sector location table (SLT). Because the work memory 40 is volatile, data is not stored in the work memory 40 immediately after the device 100 is powered on or reset. The logical address-physical address conversion information is prepared as needed in response to an access request received from the host computer system. Sub-division C provides detailed structures of the unit information table and the sector location table, and sub-division D describes the routing for preparing these tables.

The buffer memory 30 provides temporary storage for data that is transferred between the host computer system and the flash memory 50.

The memory controller 60 is a dedicated controller for enabling access of the flash memory 50 based on a physical address.

The flash memory 50 operates as the storage medium for the semiconductor memory device 100 and is used to store files and data. The flash memory 50 is, for example, multiple memory modules of 32 M bits each. A 32-MB flash memory may include eight memory modules, while a 64-MB flash memory may include sixteen memory modules. Generally, the memory capacity of the semiconductor memory device 100 corresponds to the memory capacity of the flash memory 50, and typically does not include the capacities of the buffer memory 30 and the work memory 40. In other words, the memory space of the device 100 corresponds only to the memory space in the flash memory 50, and does not include the space in the buffer memory 30 and the work memory 40.

The semiconductor memory device 100 may be, for example, a PC card type that conforms to the electrical/mechanical standard developed by PCMCIA/JEIDA. An example of a host computer system that the semiconductor memory device 100 can be attached to is the "IBM ThinkPad 760C/CD ("ThinkPad" is a trademark of IBM Corp.)" or "IBM PC750," provided by IBM Japan, Ltd.

B. Arrangement of semiconductor memory

Figure 2:
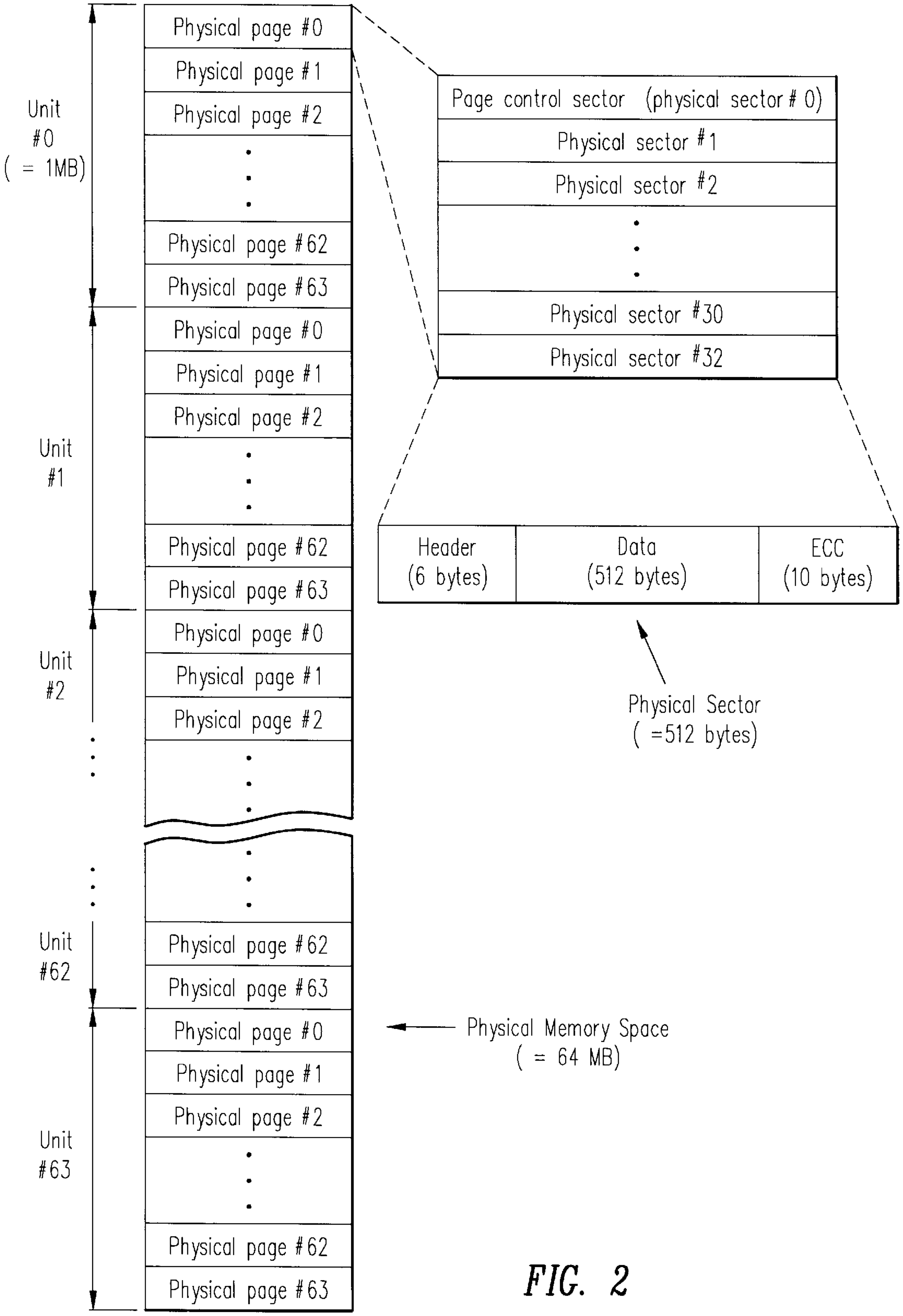
FIG. 2 is a schematic diagram illustrating the structure of a physical memory space in the semiconductor memory device 100.

Physical memory space:

FIG. 2 is a schematic diagram illustrating the structure of the physical memory space in the semiconductor memory device 100. The physical memory space provides a one-dimensional representation of the storage area in the flash memory 50.

The physical memory space is divided into respective memory units. For one embodiment, one unit is approximately 1 MB such that the memory capacity of a 64-MB flash memory 50 includes 64 units. As is shown in FIG. 2, unit numbers #0 through #63 represents their respective units, beginning with the first unit in the physical memory space.

Each unit may include 64 physical pages. Physical page offsets #0 through #63 represent their respective physical pages in ascending order from the first page of the memory unit. For one embodiment, one erase operation is performed for a whole physical page.

Each physical page may include 32 physical sectors. Physical sector addresses (absolute physical sector addresses) represent their respective physical sectors in ascending order from the first sector in the physical memory space. For one embodiment, one physical sector may be 528 bytes. Physical page offsets (relative physical sector addresses) are allocated for the physical sectors #0 through #31 in ascending order from the first sector of a page.

The first sector in each physical page, i.e., the 0-th physical sector, is used as a "page control sector" for storing page management information, and is typically not used for writing files and data. The page control sector stores a page number (which will be described later) for a logical page corresponding to the physical page currently being allocated, a sequence number, and other control information.

The remaining first through 31st physical sectors of a physical page are used as "data sectors" for storing files and data. The data sector may include three fields: a header portion having a 6-byte length, a data portion having a 512-byte length, and an ECC portion having a 10-byte length. The address of a logical sector corresponding to the physical sector currently being allocated and CRC (Cyclic Redundancy Check) code are written in the header portion. The data to be accessed are written in the data portion. An error correction code is written in the ECC portion.

For one embodiment, the memory space is managed by the "sectors", which provide the minimum addressible units, and by the groups called "units" and the sub-groups called "pages". This hierarchial structure allows the physical sector to be addressed by the absolute physical sector address, and can also be relatively addressed by a unit number, a physical page offset in a unit, and a sector offset in a physical page.

The hierarchical system memory space titles, (i.e., units, pages and sectors), and the sizes of the units, the pages, and the sectors are merely design choice, and do not limit the scope of the present invention. It should be understood that the present invention may include different hierarchial system memory space titles and memory spaces having different physical sizes.

Sequence numbers are used to identify the order in which data have been written in a physical page. A logical page may be permitted to occupy two or more physical pages at the same time. This often enhances the performance by eliminating the erasing of unnecessary pages each time data is written. A semiconductor memory device, "IBM Solid State File," provided by IBM Corp., permits one logical page to use two physical pages at the same time. The simultaneous use of two physical pages is not, however, directly related to the subject of the present invention, and no further explanation for it will be given here.

The other control information to be written in the page control sector includes the frequency at which data has been erased and bad sector information. The frequency at which data is erased is used to provide a uniform service life for physical sectors. The bad sector information is used to specify which sectors in a physical page are bad.

Figure 3:
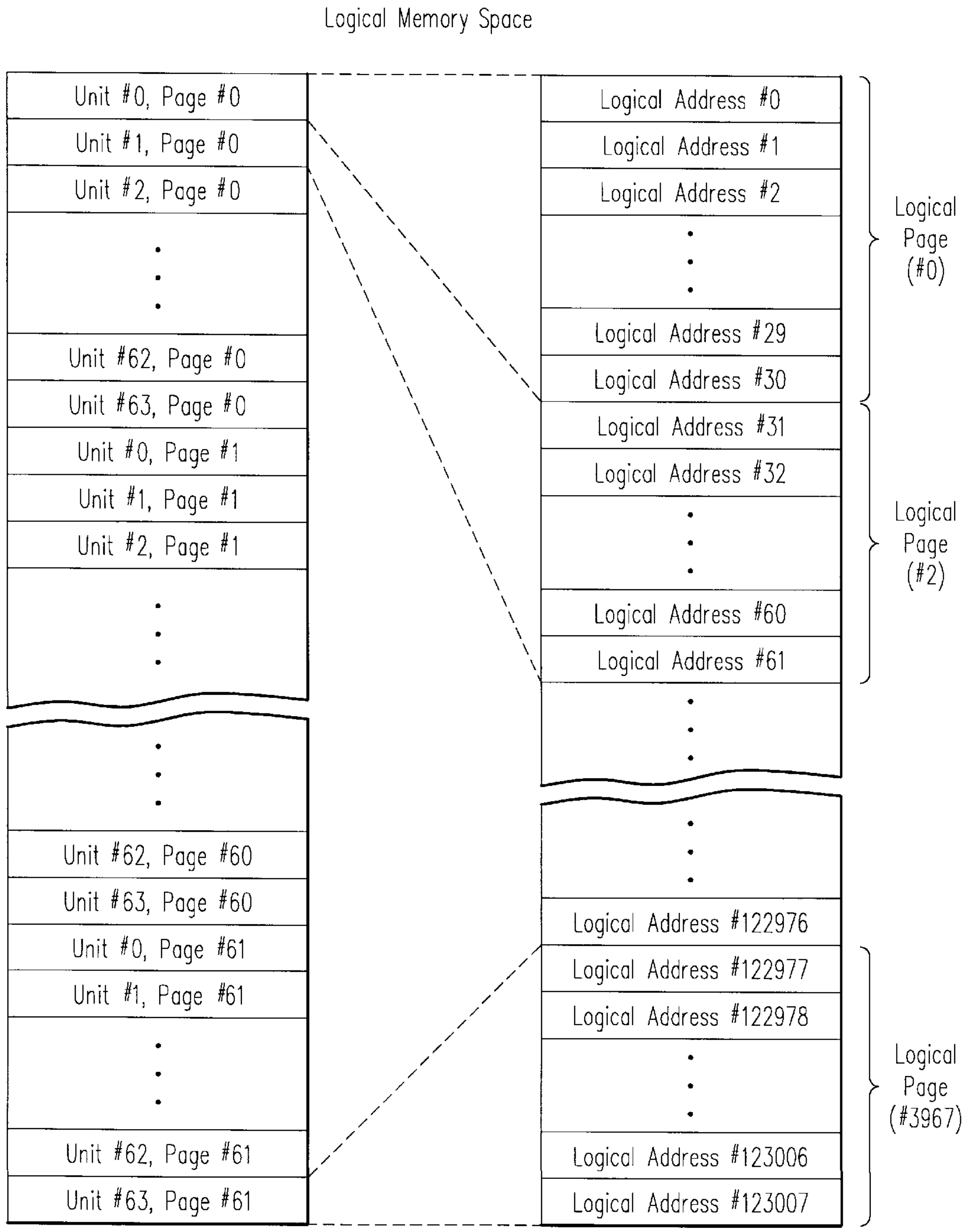
FIG. 3 is a schematic diagram illustrating the structure of a logical memory space in the semiconductor memory device 100.

Logical memory space:

FIG. 3 is a specific diagram illustrating the logical memory space in the semiconductor memory device 100. Absolute logical sector addresses are assigned for the corresponding sectors in the logical memory space, in ascending order from the first sector. The host computer system can designate an access destination in the physical memory by using a logical sector address.

The logical memory space is divided into logical pages by each of 31 logical sectors. The sector size for a logical page is one less than that for a physical page because a page control sector (previously described) that can not be used for storing data is eliminated.

In addition to providing an absolute logical page number (number in parentheses in FIG. 3) for each logical page in the logical memory space in ascending order from the first page, a unit number and a logical page offset in a unit assigned for each logical page is also provided. The unit in this specification refers to both a "physical unit" and a "logical unit." The set of physical pages and the set of logical pages assigned for each unit are fixed, and the pages assigned to the unit are not dynamically altered during the operation. Although a physical page used for a logical page may be dynamically changed in a unit during a writing operation, the employment of a physical page in another unit is inhibited.

Figure 4:
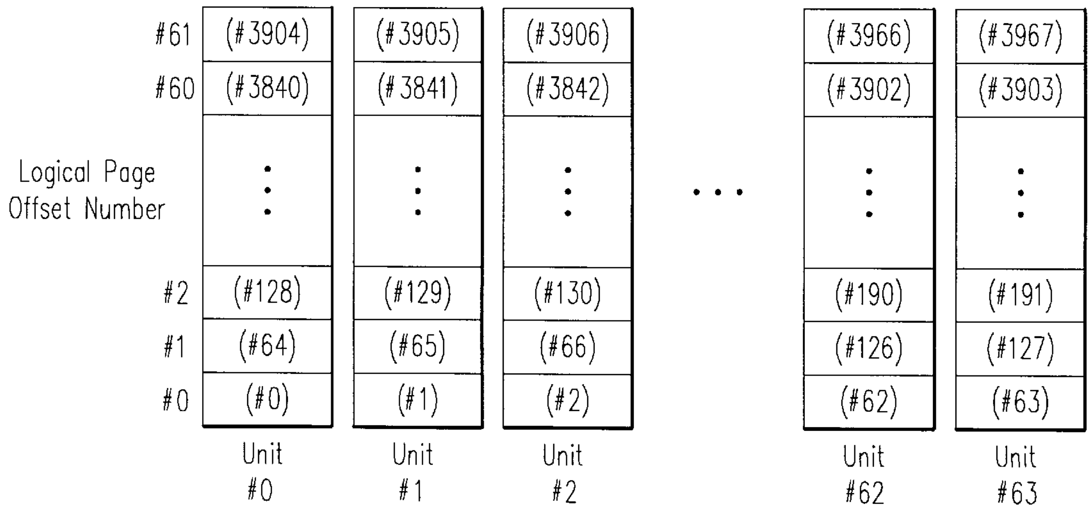
FIG. 4 is a schematic diagram illustrating the state where logical pages are mapped to respective units.

For one embodiment, logical pages are distributed to respective units, in ascending order from the first page in the logical memory space. In other words, beginning with the first logical page, the logical pages are assigned as the first pages, pages #0, of the numerically ordered respective units, unit #0, unit #1, unit #2, . . . When the 63rd logical page is assigned as the first page #0 of unit #63 as the last unit, the assignment sequence is repeated, beginning with unit #0, the logical pages, beginning with the 64th page, being assigned as page #1 of the numerically ordered respective units, unit #0, unit #1, unit #2 . . . . FIG. 4 is a specific diagram illustrating the mapping of the logical pages to the units. As is shown in FIG. 4, 62 logical pages having absolute logical page numbers, (i−1), (i−1)+64, (i−1)+64×2, . . . , and (i−1)+64×61, are assigned to unit #i (i is an integer of 0 to 63). The logical page count in a unit is two smaller than the physical page count because a maximum of two logical pages are permitted for the simultaneous use of two physical pages. Since the simultaneous employment of two or more physical pages is not directly related to the subject of the present invention, no further explanation of this matter will be given here.

In the host computer system, the input/output of files and data is controlled by a file system (FS) provided among an operating system (OS). According to the FS, generally, an access request by an application tends to be locally concentrated. Since the service life of a physical sector in the flash memory 50 is determined in accordance with the number of erase operations performed, the memory space employment method whereby access is concentrated in a specific physical area is not efficient. According to the logical page mapping method shown in FIGS. 3 and 4, logical pages in the logical memory space that are sequentially arranged in the order of their absolute logical page numbers can be assigned to respective units. As a result, the logical pages that are sequentially positioned in the logical memory space are sequentially positioned are dispersively positioned in the physical memory space, i.e., dispersively positioned at real storage locations in the flash memory 50. For example, although the logical pages having absolute logical page numbers #0 and #1 are adjacent to each other in the logical memory space, the former page is mapped to unit #0, while the latter is mapped to unit #1, with the two pages inevitably being separated in the physical memory space. Even without the FS being aware of this arrangement, the physical memory space of the flash memory can be uniformly and efficiently used.

Since the logical memory space is mapped as shown in FIGS. 3 and 4, a unit number corresponding to a specific logical sector address and a logical page offset in the unit can be acquired by the following calculations. For one embodiment the quotient obtained by dividing the logical sector address by 31 corresponds to the absolute logical page number, and the remainder is a logical sector offset in a page (31 is a sector size for a logical page). The quotient obtained by dividing the acquired absolute logical page number by the unit count (64 in this embodiment) is a logical page offset, and the remainder is a unit number. For absolute logical sector address #61, for example, the quotient 1, obtained by dividing 61 by 31, is the absolute logical page number, and the remainder 30 is the logical sector offset. The quotient 0, obtained by dividing the quotient 1 by the unit count 64, is the logical page offset, and the remainder 1 is a unit number. For the logical sector address #10000, the quotient 322, obtained by dividing 10000 by 31, is the absolute logical page number, and the remainder 18 is the logical sector offset. The quotient 5, obtained by dividing the quotient 322 by the unit count 64, is the logical page offset, and the remainder 2 is the unit number.

C. Management of semiconductor memory accesses

The work memory 40 stores logical address-physical address conversion information for converting a logical address, by which the host computer system designates an access destination, into a physical address, which is a real and physical location in the flash memory 50. For one embodiment, the logical address-physical address conversion information is managed by using two types of tables: a unit information table (UIT) and a sector location table (SLT).

As was previously mentioned, the work memory 40 is volatile memory, so that the UIT and the SLT are merely temporarily stored in it. The contents of these tables are lost when the semiconductor memory device 100 is powered off. For one embodiment, the UIT and the SLT are prepared, as needed, after the semiconductor memory device 100 is powered on or a reset has occurred and when the tables are required in response to an access request to the flash memory 50. The data structures of the UIT and the SLT will now be described. The succeeding sub-division D should be referred to for the detailed procedures for preparing the UIT and the SLT.

Figure 5:
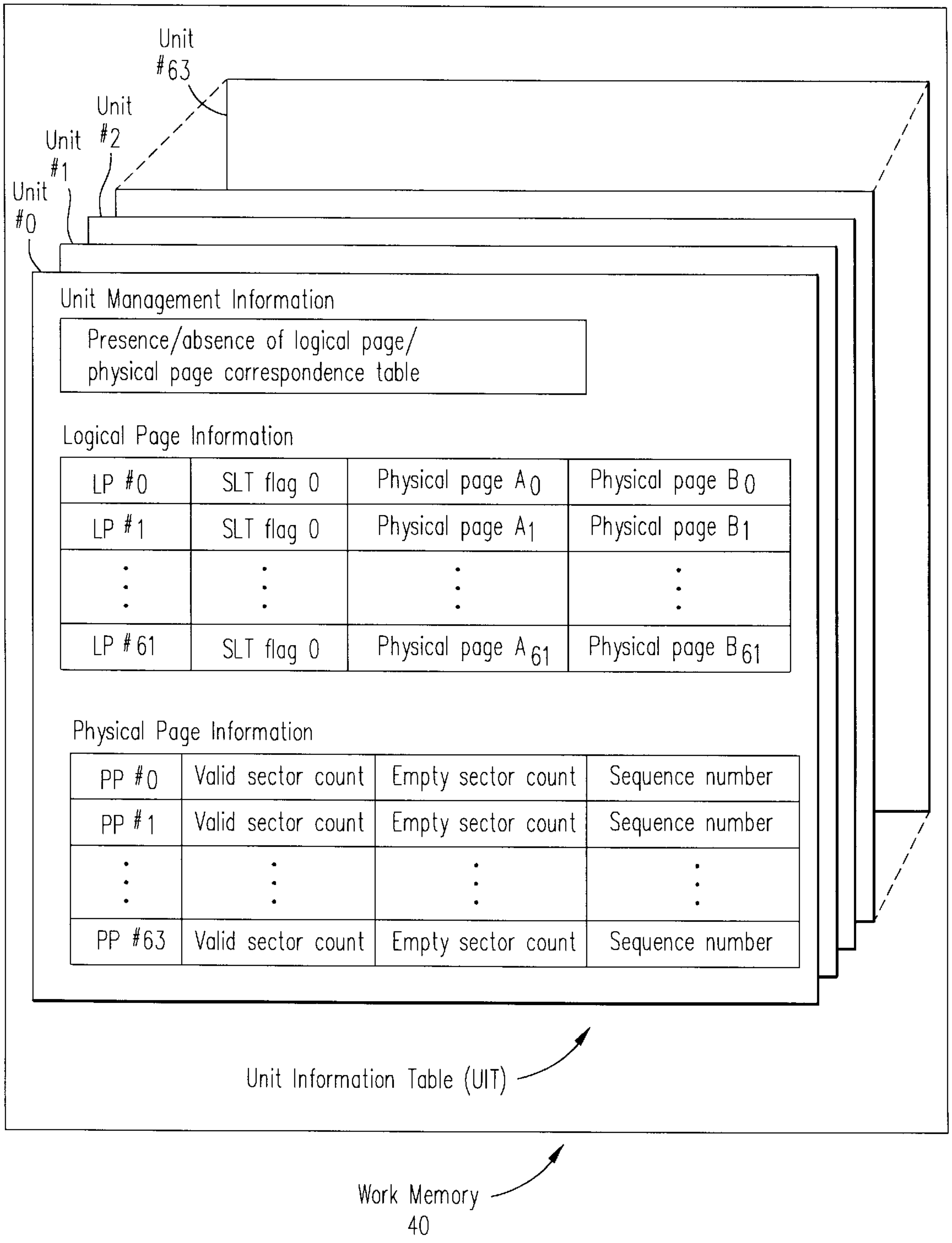
FIG. 5 is a schematic diagram illustrating a unit information table (UIT) storage area in a work memory 40, and its structure.

Unit information table:

The unit information table (UIT) is used to manage address conversion information by the unit. The number of UITs that are to be prepared in the work memory 40 is the equivalent to the total unit count. FIG. 5 is a schematic diagram illustrating a UIT storage area prepared in the work memory 40. One UIT typically includes unit management information, logical page information, and physical page information.

The unit management information is a flag for indicating whether a correspondence table between logical pages and physical pages that constitute a unit has been prepared, i.e., whether physical pages have been written in respective entries in logical page information (which will be described later). When the logical page/physical page correspondence table for a corresponding page has been prepared, the flag is set. In this embodiment, the "logical page/physical page correspondence table" is provided as one part of a logical page information table. When the physical page numbers, corresponding to the logical pages currently being used, are written in the respective entries of the table, it is assumed that the correspondence table has been prepared.

The logical page information is a table used for managing logical pages in a unit. The logical page information consists of entries that correspond in number to logical pages in a unit, i.e., 62 entries, one entry being allocated for each logical page in the unit. The respective entries include an SLT flag and a physical page field.

The SLT flag is used to indicate whether the SLT for the logical page corresponding to the entry is currently prepared in the work memory 40. The SLT flag is set for a logical page that is currently using the SLT storage area. The SLT flag is reset when a logical page in another unit having the same page offset begins to use the SLT storage area.

The physical page field is used to write a physical page offset for a physical page that a logical page corresponding to the entry is currently using. When a logical page is permitted to use two physical pages at the same time, two physical page fields (physical page A field and physical page B field) can be provided for the logical page.

In a logical page information table that has respective entries assigned in the numerical order of the logical page offsets, the first field (LP #n), where the logical page offset is to be written, can be eliminated for each entry.

The physical page information table is used to manage the physical pages inside a unit. Physical page information consists of a number entry that correspond to the physical pages in a unit, i.e., 64 entries, one entry being allocated for each physical page in the unit. Each entry includes fields which store the number of valid sectors in a physical page, i.e., the number of sectors in which valid data are written; the number of empty sectors, i.e., the number of currently unused sectors; and the sequence number (previously described). The first field (PP #n), where the physical page offset is to be written, in each entry can be eliminated by assigning the entries in accordance with the numerical order for the physical page offsets. The physical page information, which is referred to when the writing/erasing of a physical page is performed, will not be explained further in detail because it is not directly related to the subject of the present invention.

Sector location table:

The sector location table (SLT) is a conversion table used to convert a logical sector address into a physical sector address. For one embodiment, one SLT is prepared for each logical page. An SLT storage area in the work memory 40 is shared by the pages in the respective units that have the same logical page offset. For example, the second SLT area is used in common by the pages mapped in the units for logical page offset #2. When the logical page offset #2 of unit #2 is accessed, the second SLT area is used. When the logical page offset #2 in another unit is accessed, the second SLT is updated for the new logical page, which is thereafter used. As a result, only 62 SLTs, a count that corresponds to the number of logical pages in a unit, can be prepared.

Figure 6:
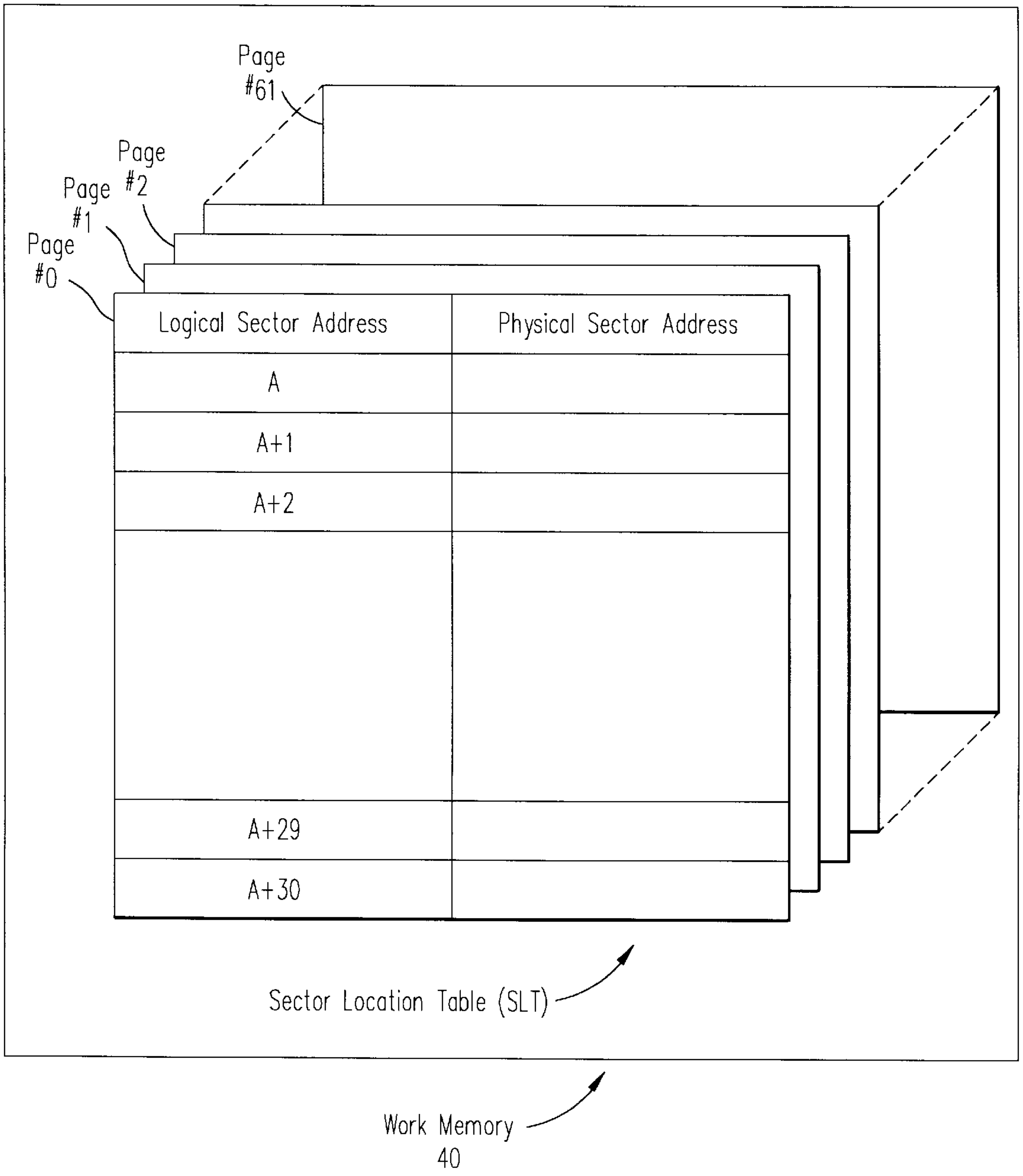
FIG. 6 is a schematic diagram illustrating a sector location table (SLT) storage area in the work memory 40, and its internal structure.

FIG. 6 is a schematic diagram illustrating the SLT storage area prepared in the work memory 40. As is shown in FIG. 6, 62 SLTs are prepared in the work memory 40. The n-th SLT area is shared by the logical pages in the respective units having the logical page offset number #n.

One SLT includes entries in number that corresponds to the logical sectors in a logical page, i.e., 31 entries. The left field in the SLT can be eliminated by assigning entries in order of logical sector offsets. Written into the right field in the SLT is a physical sector address to which a corresponding logical sector is currently allocated.

Although, for one embodiment, one SLT area is shared by the pages in the respective units that have the same logical page offset, the common use of one SLT area by the members of a group is not limited to such a page grouping. For example, one SLT area may be used in common by the logical pages in a unit, or a single SLT area may be used in common by all of the logical pages in a logical memory space. And as the number of logical pages that use one SLT area in common increases, a proportionate savings is realized relative to the use of the available memory space in the work memory 40. However, since the opportunities to update the contents of an SLT are increased in accordance with the amount of memory saved, a trade-off relationship exists between the page grouping using the SLT area in common and the access speed. A designer of the semiconductor memory device 100 can determine which page grouping should be employed to use an SLT area in common by taking the trade-off into account.

D. Operation for accessing semiconductor memory device

The hardware arrangement of the semiconductor memory device 100 according to the present invention has been explained in the previous sub-divisions. In this sub-division, the operation of the memory device 100 and the method of the present invention is described. Most of the steps described in this sub-division involves the operation of microprocessor 10 under the control of the program code.

Figure 7:
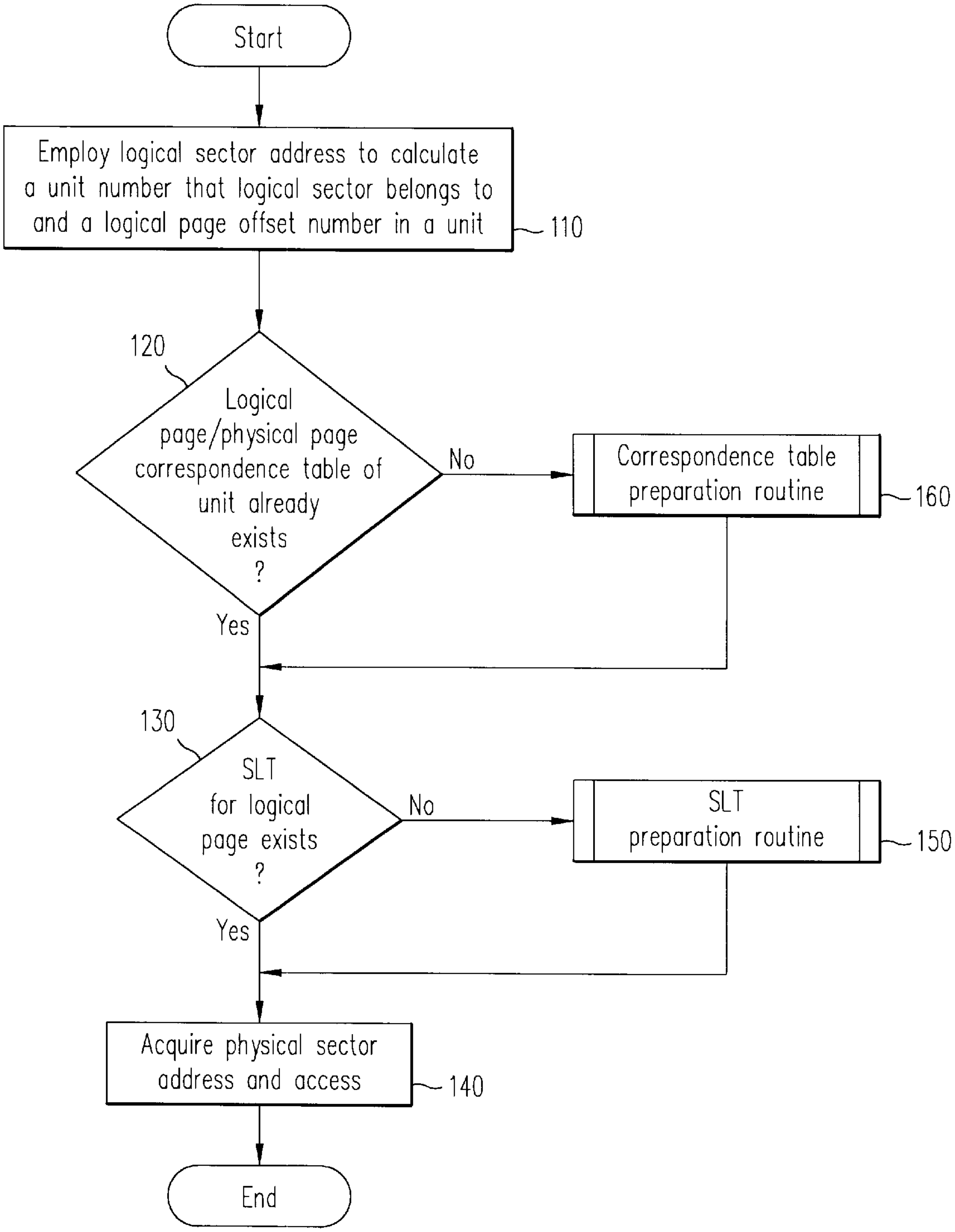
FIG. 7 is a flowchart for the processing performed by the semiconductor memory device 100 when an access request (including a read access and a write access) is issued by a host computer system to the semiconductor memory device 100.

FIG. 7 illustrates the method performed by the semiconductor memory device 100 when the host computer system issues an access request (i.e., including both a write access and a read access) to the semiconductor memory device 100.

The access operation may be initiated when the host computer system writes a command and a logical sector address that addresses an access destination into the registers of the interface circuit 20.

When the microprocessor 10 has read the logical sector address, it acquires a corresponding unit number and a logical page offset in a unit by using a predetermined calculation method (step 110). For one embodiment the quotient may be obtained by dividing the logical sector address by 31, which corresponds to the absolute logical page number, and the remainder is the logical sector offset in the page (refer to sub-division B). The quotient obtained by dividing the acquired absolute logical page number by the unit count (i.e., 64 in this embodiment) is the logical page offset, and the remainder is the unit number. For example, if the requested logical sector address is #61, the quotient 1, obtained by dividing 61 by 31, is the absolute logical page number, and the remainder 30 is the logical sector offset. The quotient 0, obtained by dividing the quotient 1 by unit count 64, is the logical page offset, and the remainder 1 is the unit number. Similarly, if the requested logical sector address is #10000, the quotient 322, obtained by dividing 10000 by 31, is the absolute logical page number, and the remainder 18 is the logical sector offset. The quotient 5, obtained by dividing the quotient 322 by the unit count 64, is the logical page offset, and the remainder 2 is the unit number.

At decision step 120, a check is performed to determine whether or not a table (also referred to as a correspondence table) has already been prepared in the work memory 40 for the logical pages and physical pages of a unit to which the requested logical sector belongs. This determination is performed by ascertaining whether or not the unit management information flag in a corresponding UIT in the work memory 40 has been set. For example, if the logical sector address is #61, the flag in the UIT #1 should be referred to. When the result obtained at decision step 120 is affirmative, program control advances to step 130. On the other hand, when the result obtained at step 120 is negative, program control jumps to a "correspondence table preparation routine," as shown by box 160. Once the correspondence table is prepared, the program control proceeds to step 130. The details of the correspondence table preparation routine is described in conjunction with FIG. 8.

At decision step 130, a check is performed to determine whether or not the SLT for a logical page to which the requested logical sector belongs exists in the work memory 40. The determination is performed by referring to the SLT flag in a corresponding entry in the logical page information table in the UIT. For example, if the logical sector address is #61, the logical page offset is #0 and the SLT flag in entry #0 of the logical page information table should be referred to. If the result obtained at decision step 130 is affirmative, program control advances to step 140. If the result obtained at step 140 is negative, program control jumps to an "SLT preparation routine," as shown by box 150. Once the SLT for a corresponding page is prepared, the program control proceeds to step 140. The details of the SLT preparation routine is described in conjunction with FIG. 9.

At step 140, the SLT for the logical page to which the requested logical sector belongs is referenced to obtain the corresponding physical sector address. For example, if the logical sector address is #61, the logical page offset is #0, and the sector offset in the page is #30, the entry #30 of the SLT #0 in the work memory 40 is referenced to obtain a physical sector address. Based on the acquired physical address, the microprocessor 10 can access a designated physical sector in the flash memory 40 through the memory controller 60. The data stored in the physical sector are temporarily held in the buffer memory 30 and then transferred.

The acquisition of the physical page information and the SLT entry is performed in substantially the same manner for both writing and reading operations. When a requested access is a write access accompanied by the change of a physical page to which the accessed logical page is allocated, or is accompanied by an erasing operation of the physical page, the logical page information and the physical page information in the UIT shall be updated as necessary.

Figure 8:
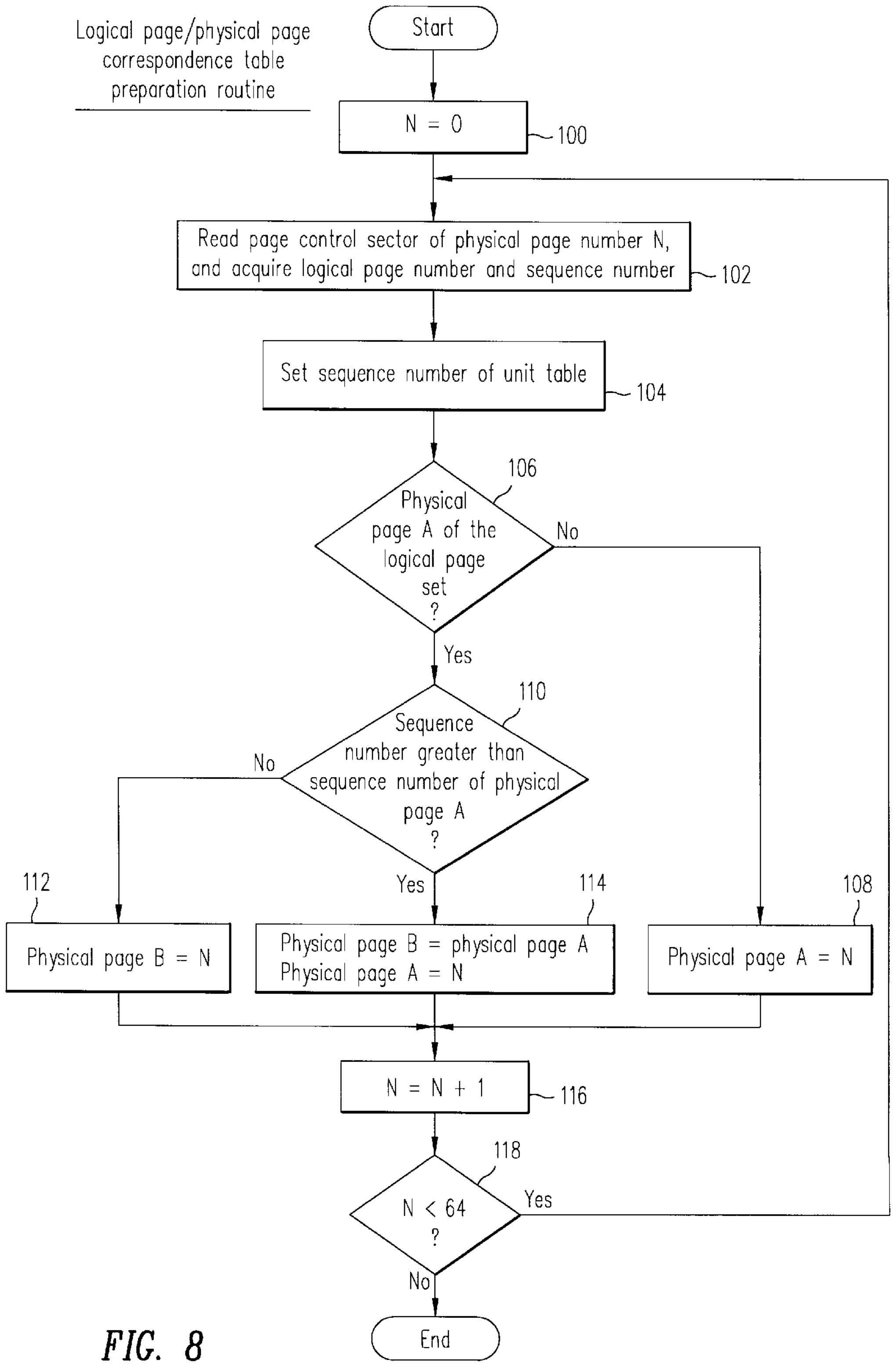
FIG. 8 is a flowchart of a logical page information preparation routine.

Logical page/physical page correspondence table preparation routine:

When it is determined in step 120 that a table for correspondence of logical pages and physical pages for a corresponding unit has not yet been prepared, program control jumps to the routine shown in FIG. 8. This routine completes a logical page/physical page correspondence table for a unit to which a logical sector to be accessed belongs.

At step 100, the variable N is set to the initial value 0. N represents a physical page offset in a unit.

At step 102, a page control sector (previously described), which is the first sector of a physical page relative to physical page offset #N, is accessed in order to obtain a logical page offset for a logical page to which the physical page is currently being allocated, and a sequence number for the physical page.

At step 104, a sequence number is written in the N-th entry location of the physical page information table in the UIT. The sequence number is used to permit one logical page to use two physical pages at the same time (previously described).

At decision step 106, the entry #n in the logical page information table is examined to determine whether or not the physical page offset of a physical page, to which the logical page is currently allocated, is registered in the physical page A field. When the physical page offset has not yet been registered, physical page offset #N is written in the physical page A field in the entry (step 108).

If the physical page offset for the physical page has been registered, the sequence number of the physical page offset registered in the physical page A field is compared with the sequence number for the physical page offset #N (step 110). The physical page offset having the larger sequence number is registered in the physical page A field, and the other physical page offset is registered in the physical page B field (steps 112 and 114). Since the physical page having the larger sequence number includes new sector data, this physical page is registered in the physical page A field to provide a priority for access. The sequence number obtained from the page control sector is also written in, for example, a corresponding entry location in the physical page information table.

Steps 106 through 114 are performed to register a physical page offset for a physical page, to which a logical page is currently allocated, in a corresponding entry location in the logical page information table. In case that a logical page is not permitted to use two physical pages at the same time, and that the processing for an order number is not therefore required, then the processing at steps 106 through 114 can be replaced by a simple process by which the physical page offset #N is written in the entry #n in the logical page information table.

At step 116, the variable N is incremented by one. At step 118, N is compared with 64. When N is smaller than 64, it is assumed that an unused physical page remains in the unit and the program control returns to step 102, and the above described process is repeated. When N is equal to or greater than 64, it is assumed that all the physical pages in the unit have been registered in the logical page information table; the routine is thereafter terminated.

Figure 9:
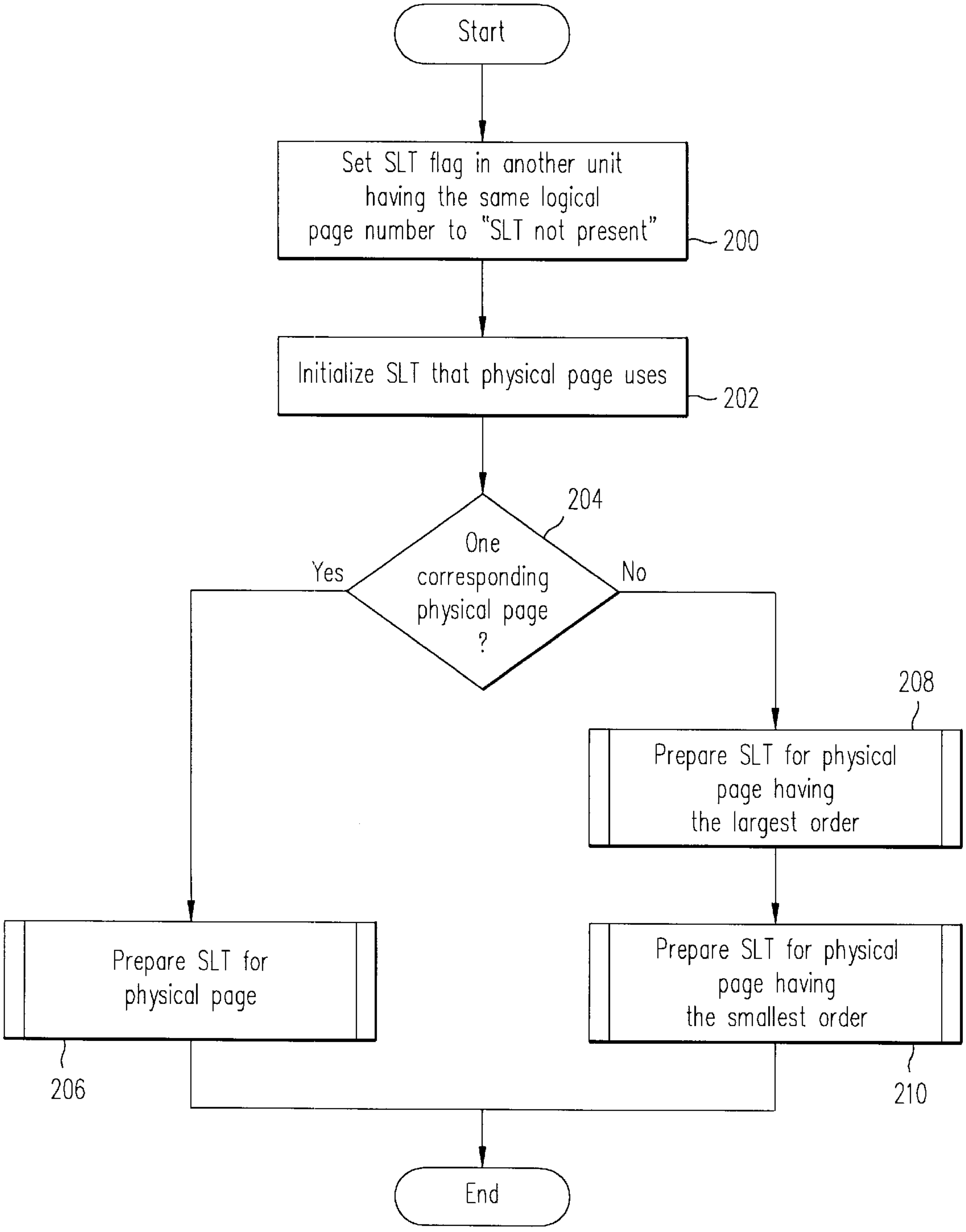
FIG. 9 is a flowchart of a sector location table preparation routine.

SLT preparation routine:

When it is determined in step 130 that an SLT for a corresponding logical page is not present, program control jumps to the routine shown in FIG. 9. This routine prepares an SLT (logical address/physical address conversion table) for a logical page to which a requested logical sector belongs.

For one embodiment, one SLT storage area is shared by pages in the respective units having the same logical page offset. When a new SLT is prepared, the contents of the previous SLT is lost. In order to indicate that the use of the SLT area is transfered from a logical page in one unit to a logical page that has the same logical page offset in another unit, the SLT flag in a corresponding entry location of the corresponding logical page information table in the former UIT is reset (step 200). For the logical page in the latter UIT, the SLT flag in the corresponding entry location in the logical page information table is set.

At step 202, the SLT area used by the logical page to be accessed is initialized.

At decision step 204, a check is performed to determine whether or not the logical page to be accessed is currently using only one physical page. The determination is performed by referring to a corresponding entry location in the logical page information table and by ascertaining whether or not a second physical page is registered in a physical page B field.

When the logical page to be accessed is using only one physical page, at step 206, an SLT for the physical page is prepared. The preparation of the SLT is performed in accordance with an "SLT preparation sub-routine" that will be described later.

When the logical page to be accessed is using two physical pages, first, an SLT is prepared for the physical page having larger sequence number (step 208). Following this, an SLT is prepared for the other physical page having the smaller sequence number (step 210). The SLTs are prepared in the descending numerical order, so that an SLT entry is made for a physical sector containing valid sector data before the others. Steps 206, 208 and 210 are performed in accordance with the sub-routine described in conjunction with FIG. 10.

When one logical page is not permitted to use two physical pages at the same time, decision step 204 and branch steps 208 and 210 are not required.

Figure 10:
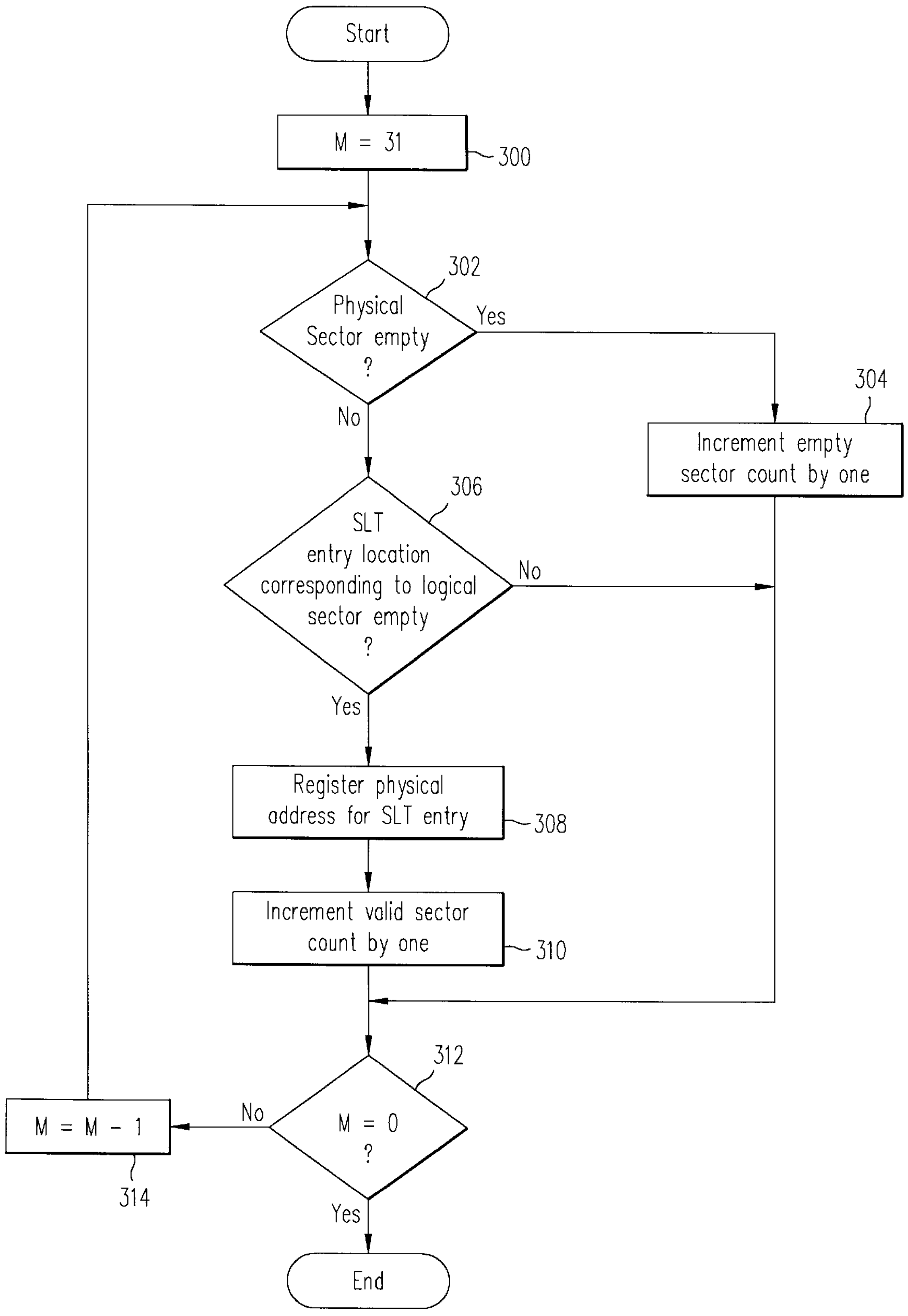
FIG. 10 is a flowchart of a sub-routine for sector location table preparation.
Figure 11:
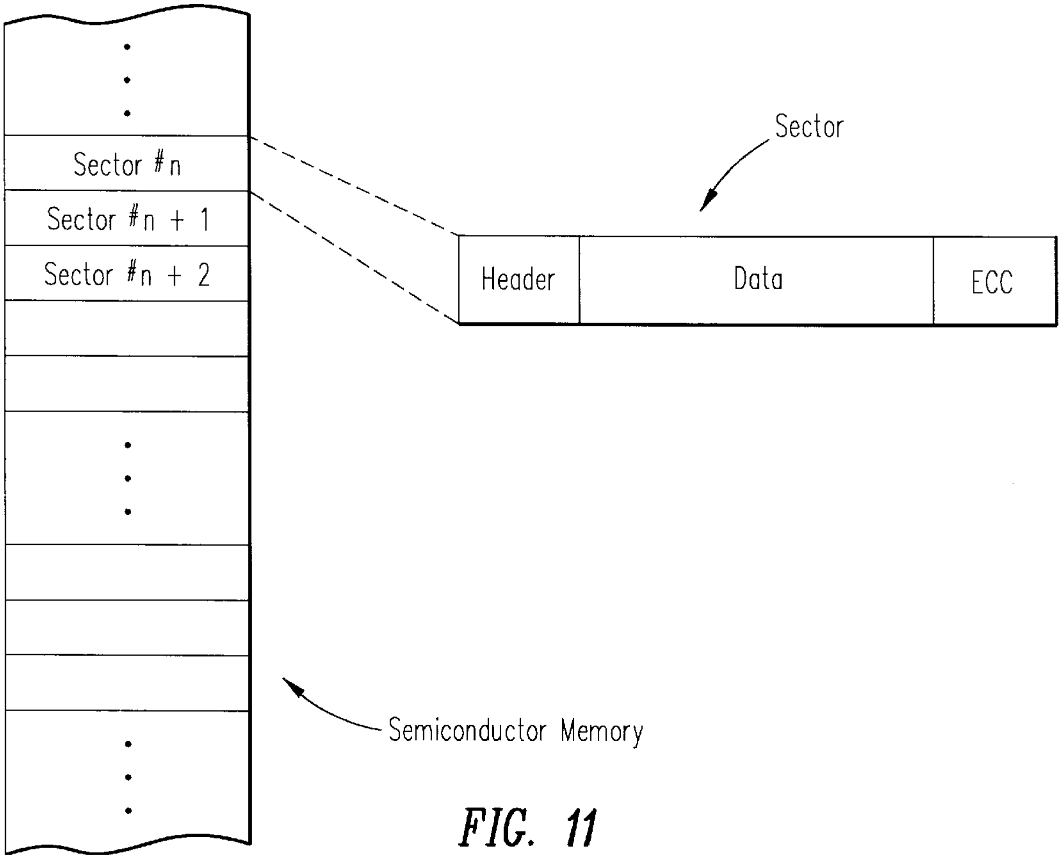
FIG. 11 is a schematic diagram illustrating the data structure of a semiconductor memory device using flash memory.

SLT preparation sub-routine:

FIG. 10 is a flowchart of a sub-routine for preparing a sector location table (SLT).

At step 300, the variable M is set to the initial value 31. M represents a physical sector offset in a physical page. Since sector count 31 in a physical page is employed as the initial value for M, the physical sectors in the physical page are registered in the SLT in descending order from the last physical sector. It depends on the circumstance where valid data is present at a higher physical sector address because data is written in a physical sector in ascending order.

If physical page offset #N in unit #K has been processed, an absolute physical sector address having the physical sector offset #M in a physical page is K×64+N×32+M. At step 302, a check is performed to determine whether the physical sector is empty, i.e., whether the physical sector is currently used by a logical sector. Whether or not the physical sector is empty can be determined by referring to the header portion of the physical sector and ascertaining a logical sector address is written therein.

If the physical sector relative to the sector offset M is an empty sector, program control advances to step 304. The empty sector count for the physical page is incremented by one, and program control moves to decision step 312.

When the physical sector relative to the sector offset #M is not an empty sector, i.e., when a logical sector address is written in the header portion, program control proceeds to step 306. At decision step 306, a check is performed to determine whether or not an SLT entry location corresponding to the logical sector address is empty.

When the use at one time of two physical sectors for one logical sector is permitted, it may be found that a physical sector containing valid data, i.e., having a larger physical sector address, has been registered and an SLT entry location is not empty. In this case, program control branches to "NO" at decision step 306 and steps 308 and 310 are skipped to eliminate the registration in the SLT entry.

When the SLT entry corresponding to the logical sector address is still empty, at step 308 the physical sector offset #M in the physical page is registered in the SLT entry. Instead of the physical sector address, an absolute value (K×64+N×32+M) for the physical sector address may be registered. When the absolute physical sector address is registered, address conversion is smoothly performed and the access speed is increased. It should be noted that since the absolute address has a greater bit width than the offset (i.e. relative address), there is an increase in the capacity of the SLT equivalent to the difference in the bit widths.

At step 310, the valid sector count for the physical page is incremented by one.

At decision step 312, a check is performed to determine whether or not M equals 0. When M=0, it is assumed that the last physical sector in the physical page has been processed, and the sub-routine is thereafter terminated. When M>0, it is assumed that an unprocessed physical sector remains in the physical page, and M is decremented by one (step 314). Program control then returns to step 302 and the above described process is repeated.

The calculations of a valid sector count and an empty sector count (steps 304 and 310) in the sub-routine are performed in order to write the result in a corresponding entry location in a physical page information table in the UIT. These calculation methods themselves are not directly related to the subject of the present invention.

In this sub-division, it should be especially noted that the unit information table (UIT) and the sector location table (SLT) are prepared only for necessary portions, and that an address conversion table having entries for all the logical sectors is not prepared. It should also be noted that the UIT and the SLT are prepared only as necessary, such as when the flash memory 50 is accessed, and that these tables are not prepared during the power-on operation of the semiconductor memory device 100. Although the SLT is prepared only for one part of the pages in the memory space, taking into account the "Principle of Locality" for the execution of a program, overhead exerts little influence on the preparation of the SLT and the performance is sufficiently enhanced.

E. Effects of the present invention on reduction of required work memory capacity In this sub-division, the effects provided by the saving of the memory space in the work memory 40 of the present invention will be explained by the calculation of the information size required for logical address-physical address conversion.

According to one embodiment of the present invention, the logical address-physical address conversion information is managed by using two table types: the unit information table (UIT) and the sector location table (SLT).

The number of UITs prepared may be equivalent to the total unit count in the memory space, (e.g., 64 UITs). Each UIT typically stores unit management information, logical page information and physical page information. The unit management information is merely a flag for which one byte is sufficient. The number of entries in the logical page information is equivalent to the logical page count in a unit, (e.g., 62 entries). Each entry may include an SLT flag and two physical page fields. For one embodiment, the physical page count in a unit is 64 (i.e., a 6-bit width) such that a one-byte physical page field is sufficient for addressing a physical page offset. A remaining bit in one of the physical page fields can be used for the SLT flag. If each entry is two bytes, 124 (=62 entries×2) bytes are adequate for the logical page information. The number of entries in the physical page information is typically the equivalent of the physical page count in a unit, e.g., 64 entries. Each entry may include a valid sector count, an empty sector count and an order number. If the valid sector count, the empty sector count and the sequence number each requires one byte, the size of each entry is three bytes. Thus, for one embodiment 192 (=64 entries×3) bytes are sufficient for the physical page information. Accordingly, one UIT may require only 317 (=1+124+192) bytes, and only 20,288 (=317×64) bytes for the entire UIT storage area.

The number of SLTs is the equivalent to the logical page count in a unit, (e.g., 62 SLTs). The number of entries in each SLT is typically equivalent to the logical sector count in a page, i.e., 31 entries. For one embodiment, if the data sector count in a page is 31 (i.e., 5-bit width), each SLT entry requires one byte to address a physical sector offset. The SLT size is 31 bytes (=31 entries×1 byte), and the entire SLT area requires only 1922 (=62×31) bytes.

Therefore, the sum of the SLT storage area and the UIT storage area, 22,210 (=20,288+1,922) bytes, adequately provides the memory capacity required for the logical address-physical address conversion information.

Figure 12:
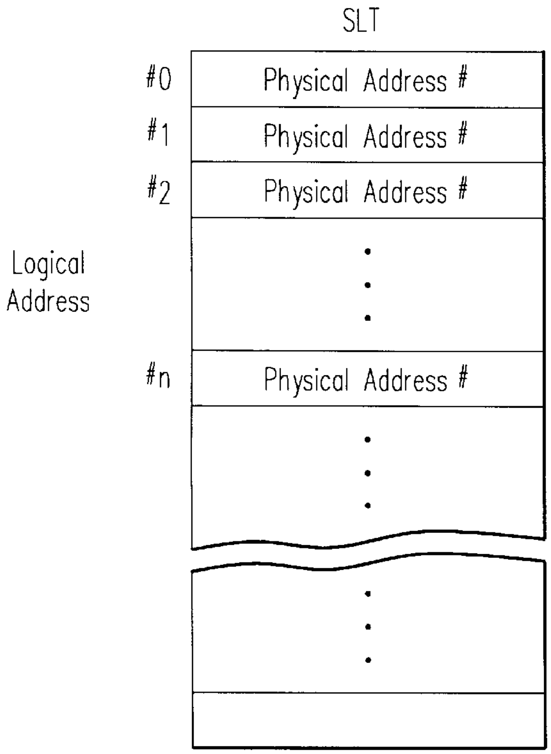
FIG. 12 is a schematic diagram illustrating the structure of an SLT (sector location table) used as positional information.

In the prior art described in the "Description of the Background," as is shown in FIG. 12, a single sector location table (SLT) having entries for all the logical sectors must be prepared for the logical address-physical address conversion information. Each entry in the SLT requires an area equivalent to or greater than an address bit width in the physical sector. Since the physical memory space, i.e., the flash memory 50, with 64 MB, for example, includes approximately 130 K sectors, an address bit width of 17 bits or more is required. And since the microprocessor 10 performs data input/output processing by the byte, three bytes (=24 bits>17 bits) are required for the SLT entry. Since the number of SLT entries required is the equivalent of the logical sector count (=123,008), the required size for the entire SLT is 369,024 (=123,008 sectors×3 bytes) bytes.

According to the present invention, therefore, the capacity of the work memory 40 that is required for address conversion information is reduced by approximately 6% (=22,210/369,024).

The present invention has been described in detail while referring to a specific embodiment. However, it should be obvious to one having ordinary skill in the art that various modifications or revisions of the embodiment are possible within the scope of the present invention. That is, although the present invention has been disclosed by using an example, it should not be limited to that example. To fully understand the subject of the present invention, the claims should be referred to.

What is claimed is:

1. A semiconductor memory device comprising:

a nonvolatile memory which is addressable by sectors;

an interface for receiving an access request from a host computer system to access data from said nonvolatile memory;

a volatile memory;

means for creating a first table in response to an access request from said host computer system representing logical-to-physical address conversion information for a page having a plurality of sectors stored in said volatile memory for converting a logical sector address into a physical sector address;

and means for creating a second table in response to an access request from said host computer system representing logical-to-physical address conversion information for a unit having a plurality of pages stored in said volatile memory for converting a logical page number into a physical page number.

2. The semiconductor device according to claim 1, wherein said means for creating a first table includes means for creating a first table storage area for each offset for the same page in each unit, so that the same table storage area can be used in common by the same offset pages in each unit.

3. The semiconductor memory device according to claim 1, further comprising first access control means for determining whether or not, in said volatile memory, there exists the first table for a page to which the requested logical sector address belongs, and means for, when a negative result for a determination is obtained, requesting said means for creating a first table to create the first table for the page.

4. The semiconductor memory device according to claim 1, wherein said means for creating a second table includes means for creating one second table storage area for each unit.

5. The semiconductor memory device according to claim 1, further comprising second access control means for calculating the number of a unit to which the requested logical sector address belongs, and for calculating a logical page offset in said unit.

6. The semiconductor memory device according to claim 1, further comprising second access control means for determining whether or not, in said volatile memory, there exists said second table for a unit to which belongs a logical sector address designated by said computer system, and means for, when a negative result for a determination is obtained, requesting said means for creating a second table to create said second table for said unit.

7. A method for accessing a semiconductor memory device having a nonvolatile memory which is addressable by sectors comprising the steps of:

(a) in response to an access request from a host computer, creating a first table representing logical-to-physical address conversion information for a page having a plurality of sectors for converting a logical sector address into a physical sector address;

(b) in response to the access request from said host computer, creating a second table representing logical-to-physical address conversion information for a unit having a plurality of pages for converting a logical page number into a physical page number;

(c) in response to the access request from said host computer system, acquiring the physical page number corresponding to the requested logical sector from said second table for said unit;

(d) in response to the access request from said host computer system, acquiring the physical sector address corresponding to the requested logical sector from said first table for said page; and (e) accessing said nonvolatile memory with the acquired physical sector address.

8. The method according to claim 7, wherein step (a) further comprises the step of creating a first table storage area for each offset for the same page in each unit, so that the same table storage area can be used in common by the same offset pages in each unit.

9. The method according to claim 7, wherein said step (d) further comprises the steps of determining whether or not there exists the first table for a page to which the requested logical sector address belongs, and when a negative result for a determination is obtained, jumping to step (a) whereat said first table is created for the page.

10. The method according to claim 7, wherein step (b) further comprises the step of creating one second table storage area for each unit.

11. The method according to claim 9 wherein step (c) further comprises the steps of calculating the number of a unit to which the requested logical sector address belongs, and calculating a logical page offset in said unit.

12. The method according to claim 7, wherein said step (c) further comprises the steps of determining whether or not, in said volatile memory, there exists the second table for a unit to which the requested logical sector address belongs, and when a negative result for a determination is obtained, jumping to step (b) to create said second table for the unit.

* * * * *